United States Patent
Costabel et al.

(10) Patent No.: US 7,955,111 B2
(45) Date of Patent: Jun. 7, 2011

(54) PLUG-TYPE MOUNT

(75) Inventors: Sascha Costabel, Otisheim (DE); Markus Schmidt, Gechingen (DE)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 12/745,273

(22) PCT Filed: Dec. 17, 2008

(86) PCT No.: PCT/EP2008/067706
§ 371 (c)(1), (2), (4) Date: May 28, 2010

(87) PCT Pub. No.: WO2009/080643
PCT Pub. Date: Jul. 2, 2009

(65) Prior Publication Data
US 2010/0304588 A1    Dec. 2, 2010

(30) Foreign Application Priority Data

Dec. 21, 2007 (DE) .......................... 10 2007 061 926
Jul. 22, 2008 (DE) .......................... 10 2008 034 131

(51) Int. Cl.
*H01R 13/28* (2006.01)
(52) U.S. Cl. ..................................................... 439/287
(58) Field of Classification Search .................. 439/287, 439/660, 950, 247, 372, 953
See application file for complete search history.

(56) References Cited

U.S. PATENT DOCUMENTS

| | | | |
|---|---|---|---|
| 3,182,367 A | | 5/1965 | Hamann et al. |
| 4,501,460 A | * | 2/1985 | Sisler .............................. 361/730 |
| 5,106,321 A | * | 4/1992 | Haroutel ......................... 439/310 |
| 5,316,493 A | * | 5/1994 | Sowers ............................ 439/346 |
| 5,382,179 A | | 1/1995 | Noschese |
| 5,818,691 A | * | 10/1998 | McMahan et al. ......... 361/679.43 |
| 6,611,147 B2 | * | 8/2003 | White et al. ..................... 324/539 |
| 7,278,869 B1 | | 10/2007 | Bernhart et al. |
| 2003/0087550 A1 | | 5/2003 | Lambiaso |

FOREIGN PATENT DOCUMENTS

| | | |
|---|---|---|
| DE | 29920497 | 2/2000 |
| DE | 202004018340 | 5/2006 |
| DE | 202006004081 | 9/2007 |

OTHER PUBLICATIONS

"Cabin customization—New Approach for A350", magazine One, German issue, Dec. 18, 2006, p. 23.

* cited by examiner

*Primary Examiner* — Phuong K Dinh
(74) *Attorney, Agent, or Firm* — Volpe and Koenig, P.C.

(57) ABSTRACT

A plug-type mount is provided for releasably holding an equipment part such as a panel or an interior trim part on a sub-frame such as a fuselage. The plug-type mount (5) includes a first holder (30) and a second holder (35) which can be fastened to one another with the aid of a holding pin (11) and a housing (20), in which the holding pin (11) can be releasably locked. The holders (30, 35) carry in each case at least one electrical contact (33, 34) and are configured in such a way that, in the case of the holding pin (11) being locked in the housing (20), the holders (30, 35) are fastened to one another and the electrical contacts (33, 34) are connected electrically. Excessive cable lengths can be avoided by the preferable use of the plug-type mount (5) in an airplane because the electrical connection is also produced and disconnected as the mechanical connection is produced and disconnected.

18 Claims, 9 Drawing Sheets

PLUG-TYPE MOUNT

BACKGROUND

The invention relates to a plug mount for a detachable fastening of an equipment part, such as a panel or an interior trim part to a sub-frame, such as an airplane fuselage, comprising a mounting pin, having at one end a groove for fastening a mounting pin and at the other end an elastic, washer shaped damper for damping oscillations and for assembling the mounting pin, which is arranged on the mounting pin between a mounting washer and an axially displaceable glide washer, and having a housing in which a spring pre-stressed slide is supported, which can be displaced by inserting the mounting pin into an opening of the housing against the spring pretension and subsequently it can latch in the groove of the mounting pin due to the spring pretension, with either the damper or the housing being assembled to the equipment part and the other one of the damper or housing being assembled to the sub-frame.

Such a plug mount forms the subject of a former, not preliminarily published German application No. 10 2007 061 926.1 (in the following called the earlier application) of the applicant.

In the cabin development of modern airplane types, such as Airbus A350, for example, it is attempted to design elements to be mounted to the airplane fuselage, such as toilets, board kitchens, passenger seats, cabin networks, cabin lighting, and air jets, as respectively complete cabin modules, with all connections being embodied as flexible standardized interfaces, if possible, and using simplified fastening concepts, allowing assembly and disassembly without the use of any tools (cf. the essay "Cabin customization—New approach for A350", magazine One, German issue, Dec. 18, 2006, page 23.) Additionally it shall be possible to reconfigure an existing design solution on short notice, for example the cabin equipment for a long-distance flight, and prepare the cabin equipment for a short-distance flight. The standardized interfaces shall here be applicable equally for all aircraft categories. Additionally, it shall be ensured that the standardized interfaces securely prevent any rattling noise of the components connected to each other.

The subject of the earlier application comprises a plug, a fastener, and a plug fastener being a combination of such a plug and fastener, known for example from the utility patent DE 299 20 497 U1, which are to be improved such that at least one of the above-mentioned problems can be solved. The connection achieved with the plug fastener according to the earlier application can be implemented and released in a simple fashion, because a precise mutual alignment of the two components to be connected is not necessary during the assembly. Furthermore, tools are not necessary, either for the assembly or for disassembly, because the creation of the connection occurs by a simple insertion according to the principle "plug and play" or "snap and click." The release of the connection can occur, for example, via an eccentric lever pressing against the spring pre-stressed slide or simply by a finger pushing against a particular handle, in order to push the slide against the spring pre-tension to such an extent that the fastening pin is released.

When in an airplane a panel, which may carry parts of the electric system, is rotated down from the ceiling or an inner panel in the manner of a flap, the cables connected together with the other equipment parts on the panel have to follow the path of the panel. In order for the cables to not hinder the movement of the panel the cables connected to the panel must comprise a certain excessive length. In an airplane in which the length of the installed cables amounts to many kilometers the above-mentioned excessive length of cables leads to an undesired additional weight, which might amount to several hundred kilograms. When a panel is to be released from the ceiling or the inner cover panel it is additionally necessary to separate electric plug connections, which later require manual reconnection during the reassembly of the panel. The plug connection according to the former application is embodied as a flexible standardized interface, however the assembly and disassembly of a panel or the like is enabled without the use of any tools, yet, it is not embodied such that it avoids excess cable lengths and the problems connected thereto.

SUMMARY

The object of the invention is to further develop a plug fastener of the type mentioned at the outset such that the above-mentioned problems are avoided, particularly the excessive length of cables and the problems caused thereby.

This object is attained according to the invention in that in a plug fastener of the type mentioned at the outset, on a housing a first fastener is provided and the glide washer is embodied as a part of a second fastener, with the fasteners each carry at least one electric contact and are embodied such that the fasteners are fastened to each other in any fastening pin held in the housing and the electric contacts are electrically connected.

Contrary to the mechanic plug fastener according to the earlier application the plug fastener according to the invention is an electromechanical plug fastener, which allows simultaneously to the assembly and disassembly of an equipment part, such as a panel to a sub-frame, to create or separate an electric connection. Here, it is only necessary to connect two cables with the electric contacts of the two fasteners provided according to the invention. The electric connection of the electric contacts is established by the insertion of the fastening pin into the housing of the first fastener and separated by pulling the fastening pin from the housing. It is not necessary for the electric connection of the cables with the electric contacts to be separated during the assembly and disassembly of a panel, therefore it is not necessary for them to be manually accessible for separation. Therefore the cables only require their minimum length, i.e. no excess length. Previously, it was necessary to open the panels to such an extent that an electric cable plug connection was accessible to be separated manually. This separation process (and analogously the process of connecting) occurs in the electro-mechanic plug fastener according to the invention only between the electric contacts of the two fasteners and additionally already at the very moment the mechanic connection is separated (and/or established) between the fastening pin and the first fastener. The excessive lengths are omitted because after the separation of the first fastener and the fastening pin no electric connection remains requiring accessibility to be manually separated. Although in prior art it is necessary first to create or to separate a mechanic connection and subsequently also an electric cable connection, which particularly requires plug connections and additional cable lengths, in the plug fastener according to the invention the mechanical and electric connection/separation between the fasteners, on the one side, and their electric contacts, on the other side, occurs in a single step.

Advantageous embodiments of the invention are provided in the dependent claims.

In an embodiment of the plug fastener according to the invention at least one of the fasteners carries at least one connection contact for establishing an electric connection between electric contacts. The connection contact facilitates the establishment of an electric connection and facilitates the construction of the electro-mechanical plug fastener according to the invention. Additionally, it facilitates the assembly of the electro-mechanical plug fastener according to the invention, because the connection contact will always be located at the correct position to allow accepting or contacting the electric contact of the other fastener.

In another embodiment of the plug fastener according to the invention, the electric contacts at each fastener can each be accepted in a contact housing and be connected to an input or output cable. The use of the contact housing leads to a further simplification of the design of the electro-mechanical plug fastener according to the invention and the cable connections.

In another embodiment of the plug fastener according to the invention, one of the two electric contacts and the connection contact are embodied in one piece. This renders the establishment of the electric connection between the electric contacts even safer and thus further facilitates this.

In another embodiment of the plug fastener according to the invention, the groove of the fastening bolt comprises two radially embodied lateral groove walls. This allows a lasting hold of the connection established between the fastening pin and the spring pre-stressed slide as long as the slide is not operated against the direction of the spring pre-tension. When the groove fails to extend over the entire circumference of the fastening pin the separation of the connection can easily occur by rotating the fastening pin, which can be pulled out of the housing as soon as the slide has left the groove.

In another embodiment of the plug fastener according to the invention, the first fastener is mounted to the housing via a slide connection. Due to the slide connection the connection between the housing and the first fastener can be easily established and separated.

In another embodiment of the plug fastener according to the invention, the first fastener comprises a bore aligned to the opening of the housing. The opening of the housing can therefore be sized such that any precise alignment of the bore and the opening of the fastening pin and the first fastener is not necessary during the assembly.

In another embodiment of the plug fastener according to the invention, the fastening washer of the second fastener can be supported or is supported on a stop of the fastening pin and the slide washer part of the second fastener can be supported or is supported on a shoulder formed on the fastening pin. Therefore, the damper can easily be assembled on the fastening pin.

In another embodiment of the plug fastener according to the invention, the fastening washer represents an annular flat spring supported on the damper with flat spring arms projecting inwardly and the stop represents an annular groove, in which the flat spring arms are supported with their free ends. This facilitates the assembly of the damper on the end of the fastening pin allocated thereto, with first the damper being fastened at an equipment part or the sub-frame.

In another embodiment of the plug fastener according to the invention, the glide washer part is formed at the second fastener. The second fastener and the glide washer part, acting in the function of the originally separate glide washer, are therefore embodied in one piece. Due to this one-piece embodiment, the second fastener can be produced in a simple fashion, for example as an injection molding part made from plastic in a single processing step. The same applies to the first fastener and at least the upper part of the housing connected thereto. Due to the fact that such a housing already exists the above-mentioned embodiment of an existing slide connection between the housing and the first fastener is the most beneficial method to connect them to each other. Alternatively, the first fastener could also be produced in a single processing step, at least with regard to the upper part of the housing.

In another embodiment of the plug fastener according to the invention, a bearing socket is formed on the glide washer part of the second fastener at the side facing away from the shoulder around a bore accepting the fastening pin, with the second fastener being supported on the fastening pin in an axially displaceable fashion and with the damper being supported on the second fastener. This embodiment improves the support of the second fastener on the fastening pin without interfering with the simple production of the one-piece second fastener because the bearing socket represents only one additional part formed on the second fastener.

In another embodiment of the plug fastener according to the invention, the axial distance between the shoulder and the fastener washer is selected such that the damper is pressed by the fastening washer against the second fastener. This ensures that in the closed status of the plug fastener, the damper is slightly compressed in the axial direction such that in a simple fashion an arbitrary pressure can be upheld over an extended period of time in the connection between the fastening pin and the second fastener. This safely avoids any play and thus also any rattling noise.

In another embodiment of the plug fastener according to the invention the fastening pin conically tapers from the shoulder at the side facing away from the fastening washer within the thickness of the first fastener and can be accepted or is accepted in a correspondingly conical bore of the first fastener in a play-free fashion. This way the fastening pin can be held securely and without play in the bore of the first fastener.

In another embodiment of the plug fastener according to the invention, the opening in the housing is a bore or an oblong bore. Particularly in case the opening is an oblong bore, the fastening pin can be inserted into the housing without requiring the bore in the first fastener and the opening in the housing to be precisely aligned to each other.

In another embodiment of the plug connection according to the invention, an eccentric lever serves to unlock the fastening pin by displacing the slide against the spring pre-tension. With the help of the eccentric lever, a defined unlocking position of the spring pre-stressed slide can be ensured. Additionally, the plug fastener can easily be released with the help of the eccentric lever.

In another embodiment of the plug fastener according to the invention, means are provided to fasten the housing to the equipment part or the sub-frame. When the housing is mounted to the equipment part or the sub-frame, if necessary, the first fastener can be exchanged for another one in a simple fashion, for example electric contacts having a different geometry.

In another embodiment of the plug fastener according to the invention, a connecting aid mounted to the damper is provided to fasten the second fastener to the equipment part or sub-frame. Using such a connecting aid the second fastener can be fastened to an equipment part or to the sub-frame in a simple fashion or be separated therefrom, if necessary.

In another embodiment of the invention, the electric contacts are embodied as spring contracts, plug contacts, or similar contacts. This allows the selection of contacts suitable for each purpose of use.

In the following, exemplary embodiments of the plug fastener according to the invention and exemplary embodiments of the plug fastener according to the earlier application are explained in greater detail with reference to the drawings.

BRIEF DESCRIPTION OF THE DRAWINGS

Shown are.

DETAILED DESCRIPTION OF THE PREFERRED EMBODIMENTS

Figure 1:
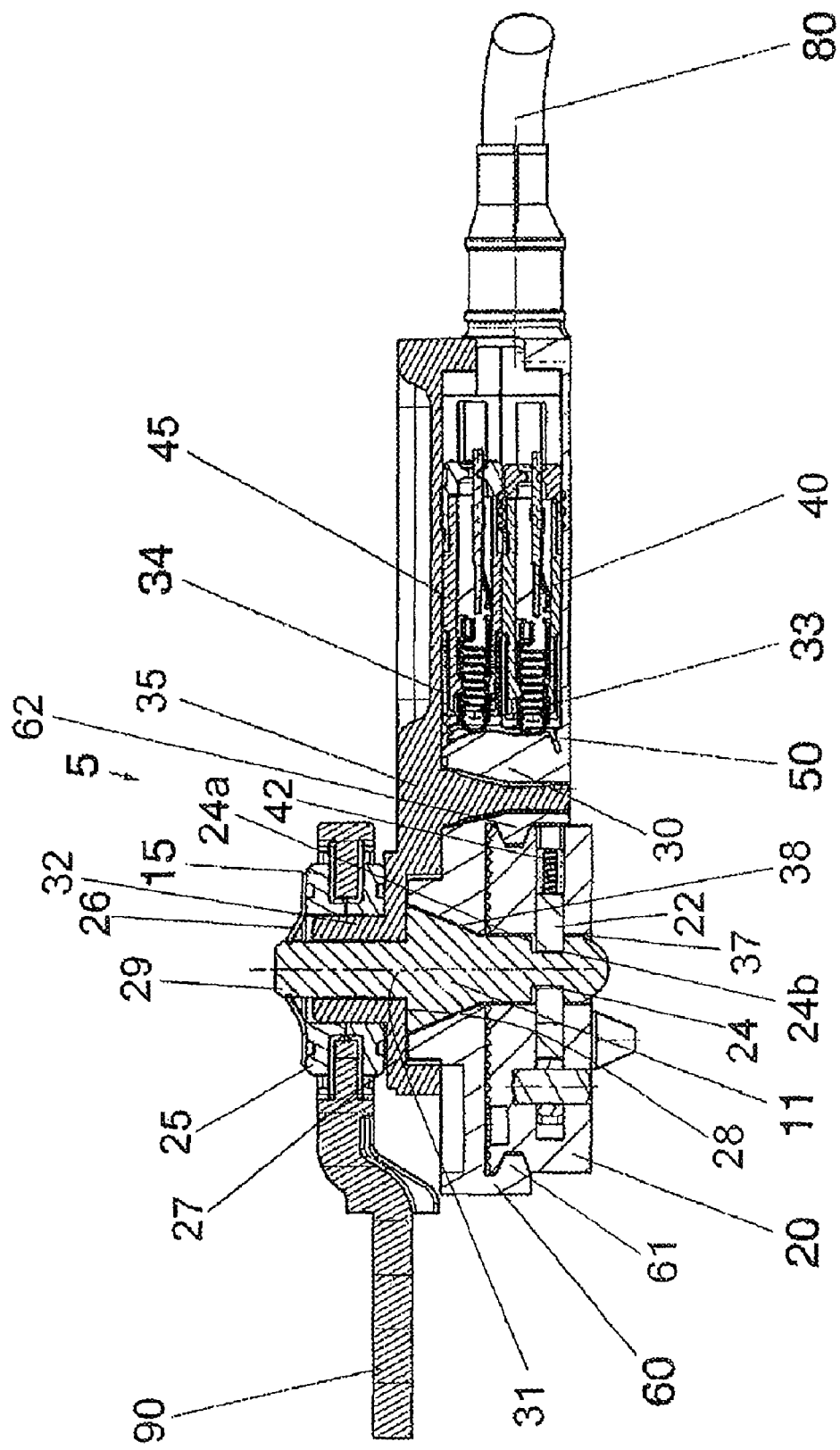
FIG. 1 is a longitudinal cross-sectional view of a first preferred embodiment of a plug fastener according to the invention in a status in which a mechanical and an electric connection can be created and secured between two fasteners for electric contacts.

For a better understanding of the invention, first exemplary embodiments of the plug, the fastener, and the plug fastener according to the earlier application of the applicant are described in greater detail with reference to the attached FIGS. 5-15. This is followed by a detailed description of exemplary embodiments of the plug fastener according to the invention using FIGS. 1-4.

An embodiment of a plug fastener according to the earlier application, marked 150 in its entirety, is shown in various views in FIGS. 7-15 in the locked and unlocked state, which is discussed in greater detail in the following. The plug fastener 150 serves for a releasable fastening of an equipment part 152 to a sub-frame 154. The equipment part 152 can represent the inner cover of the cabin of an airplane, for example. The sub-frame 154 may be the aircraft fuselage, for example. Alternatively, they could represent appropriate parts of a motor vehicle. The plug fastener 150 comprises a plug, in its entirety marked 110 and shown in detail in FIG. 5, and a fastener, in its entirety marked 130 and shown in detail in FIG. 6, which are now described in detail.

Figure 5:
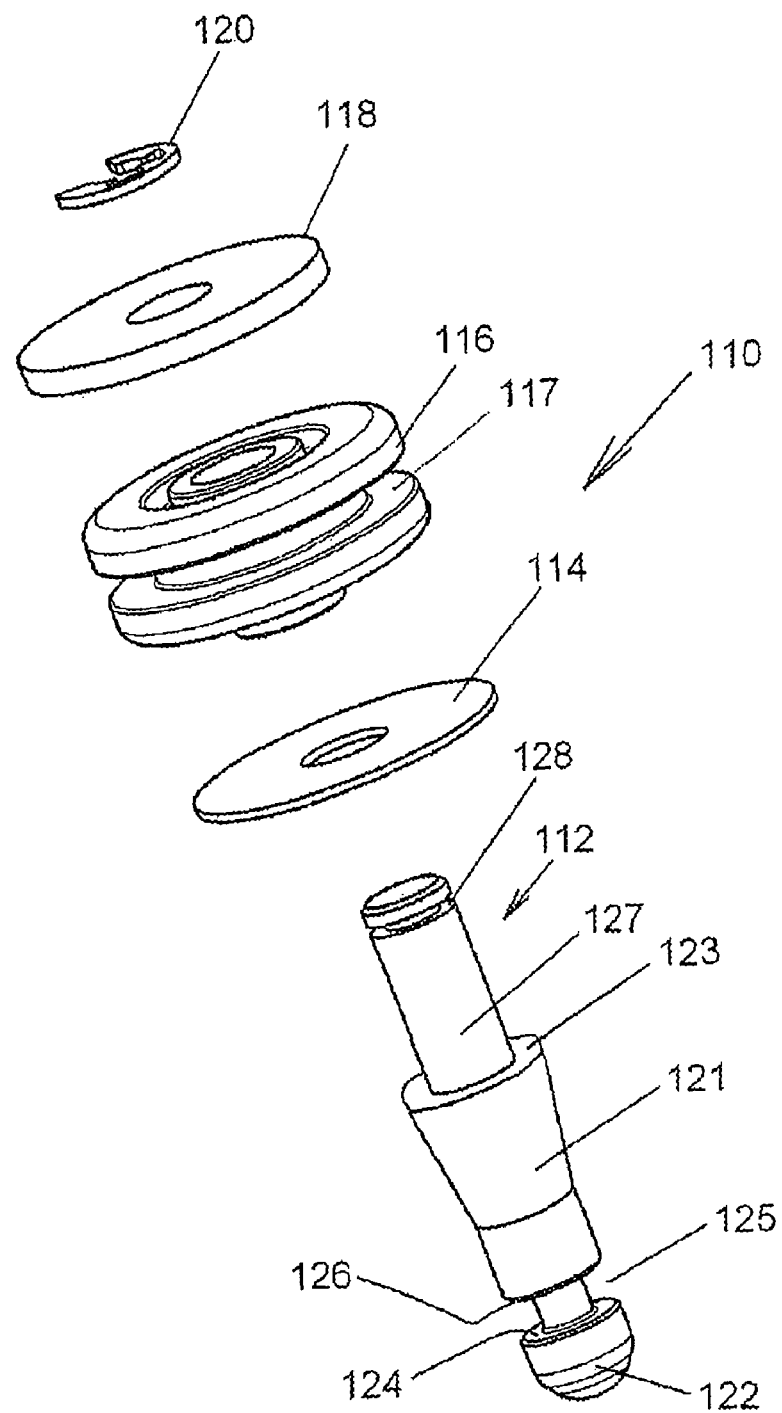
FIG. 5 is an exploded isometric view of an embodiment of the plug according to the invention.

FIG. 5 shows an exemplary embodiment of the plug 110 according to the earlier application in an exploded isometric view. The plug 110 comprises a fastener pin 112, a glide washer 114, a washer-shaped damper 116, a fastening washer 118, and an annular spring or cir-clip 120. The damper comprises an elastic material, e.g., an elastomer. It serves to dampen oscillations and to assemble the plug 120 to the sub-frame 154. One end of the fastening pin 112 is embodied as a spherically rounded dome 122. Adjacent to the dome 122, the fastening bolt 112 has a recess representing an annular groove 125 with two radially embodied lateral groove walls 124 and 126. Adjacent thereto, the fastening pin 112 comprises a conically expanding shaft section 121 such that a shoulder 123 is formed at the fastening pin 112. Here, the conical embodiment of the shaft section 121 is not critical, though. The shaft section 121 may simply be embodied cylindrically as well, however enlarged in its diameter in reference to the shaft section 127, as shown in FIGS. 7-15. The glide washer 114 is supported on the shoulder 123. The fastening washer 118 is supported on one side on the annular spring 120 and on the other side on the damper 116. The damper 116 is supported on one side with its bottom on the glide washer 114. When the damper 116, the glide washer 114, the fastening washer 118, and the cir-clip 120 are assembled on the fastening pin 112, the glide washer 112 is supported on the shoulder 123 and all above-mentioned parts mutually contact each other. When pressure is applied to the upper end of the fastening pin 112, as seen in FIG. 5, while the plug 110 with the glide washer 114 is supported on the fastener 130, the glide washer 114 moves to such an extent as the elastically compressive damper 116 is compressed, over a shaft section 127, having a smaller diameter than the shaft section 121, axially upward in the direction towards the cir-clip 120, here forming a stop for the fastening washer 118 and preventing its upward motion. In order to disassemble the parts arranged on the shaft section 127, the cir-clip 120 can be released by pulling it out of a groove 128 at the end of the shaft section 127. The annular groove 125 of the fastening pin 112 can be made to engage a clip in order to assemble the plug 110 in the fastener 130, which in the following is described in greater detail with reference to FIG. 6.

Figure 6:
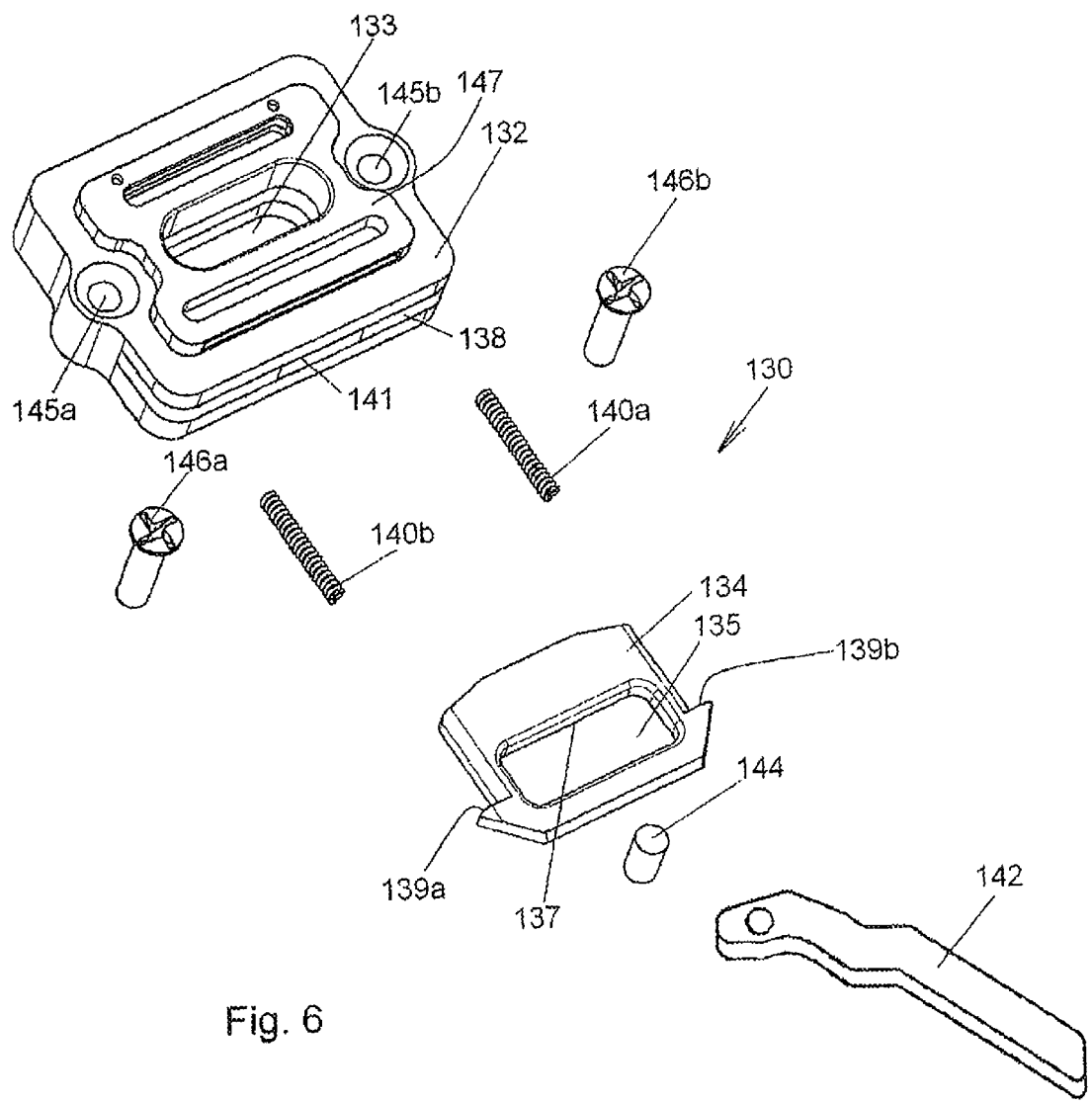
FIG. 6 is an exploded isometric view of an embodiment of the fastener according to the invention.

FIG. 6 shows in an exploded isometric view an embodiment of the fastener 130 according to the earlier application. The fastener 130 has a housing 132, in which the slide 134 is supported, pre-stressed by the above-mentioned clip. The housing 132 has a central opening 133, which is embodied as an oblong hole in the exemplary embodiment shown. The opening 133 could also be embodied simply as a bore. The opening 13 completely penetrates the housing 132, which is easily discernible in FIG. 6. The slide 134 is supported in a recess 138 of the housing 132 that opens laterally. The slide 134 has an opening 135, which can be aligned with the opening 133 of the housing 132. At the sides, the slide 134 is provided with two shoulders 139a, 139b, by which it is supported on two helical springs 140a and/or 140b, arranged in the recess 138 of the housing 132, as best discernible in FIGS. 8, 11, and 14, which is discussed in greater detail in the following. The opening 135 of the slide 134 has an edge 137 that can engage the annular groove 125 of the fastening pin 112. The edge 137 is constantly pre-stressed in the direction of a lateral housing opening of the recess 138 due to the pre-tension of the helical springs 140a, 140b. In the lateral housing opening of the recess 138, a stop 141 is provided for an eccentric lever 142 to unlatch the fastener 130 by shifting the slide 134 against the spring pre-tension applied by the helical springs 140a, 140b. The eccentric lever 142 cooperates with the stop 141 according to the illustration in FIG. 11 or with a stop 143 according to the illustration in FIG. 14. For this purpose the eccentric lever 142 is pivotal in the housing 132 around a pin 144.

Figure 11:
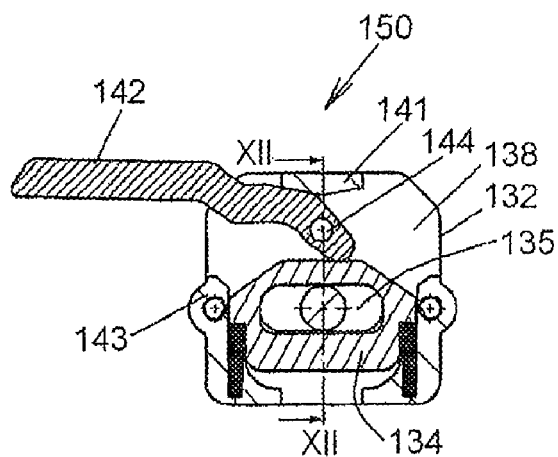
FIG. 11 is a cross-sectional view according to the line XI-XI in FIG. 10.

The stop 141 at the housing and the eccentric lever 142 are embodied such that, when both of them mutually contact, the opening 133 of the housing 132 and the opening 135 of the slide 134 are aligned to each other, as discernible in FIG. 11.

Figure 7:
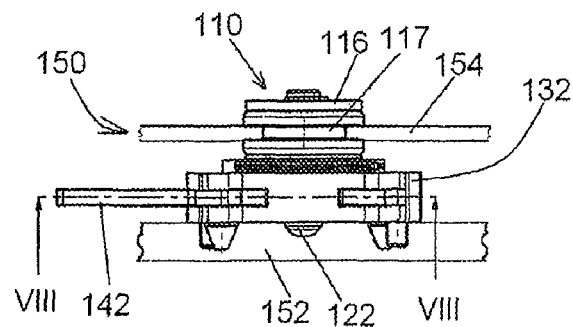
FIG. 7 is a side view of an exemplary embodiment of the plug fastener according to the invention in the locked state.
Figure 8:
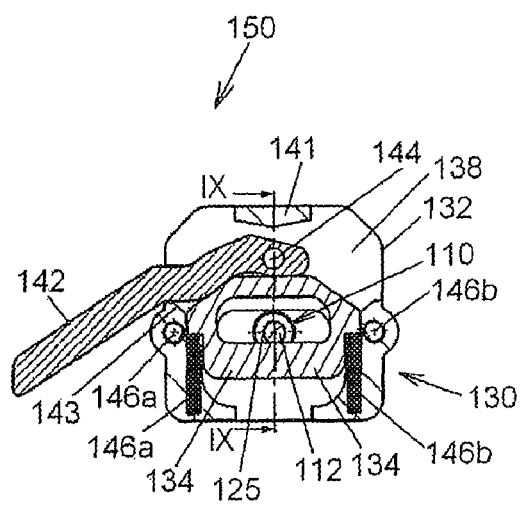
FIG. 8 is a cross-sectional view according to the line VIII-VIII in FIG. 7.
Figure 9:
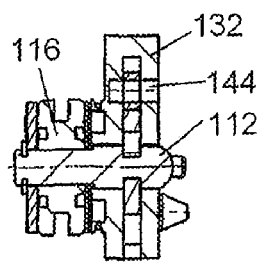
FIG. 9 is a cross-sectional view according to the line IX-IX in FIG. 8.
Figure 13:
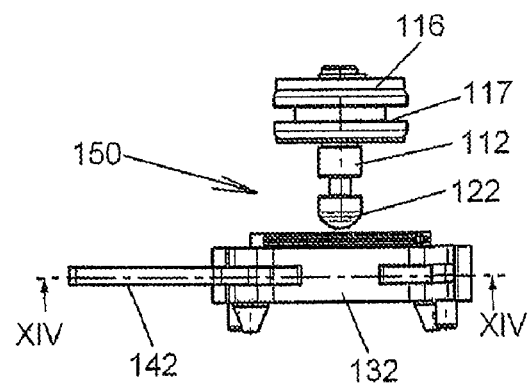
FIG. 13 is a view of the plug fastener according to FIG. 7, however in the normal state without any engagement of the fastening pins in the fastener.
Figure 14:
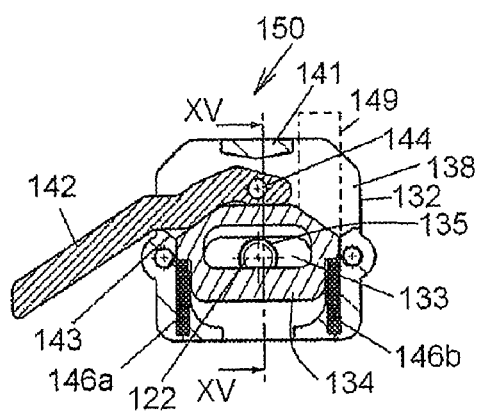
FIG. 14 is a side view according to the line XIV-XIV in FIG. 13.

Further, the stop 143 at the housing 132 and the eccentric lever 142 are embodied such that when they mutually contact the opening 133 of the housing 132 and the opening 135 of the slide 134 are off-set in reference to each other as discernible in FIGS. 8 and 14. Two bores 145a, 145b in the exemplary embodiment shown and two counter-sunk screws 146a, 146b are used to fasten the housing 132 to the equipment part 152. When the fastening pin 112 is inserted into the opening 133 of the housing, the end of the fastening pin, provided with the dome 122, displaces the slide 134 against the spring pre-tension and subsequently it latches in the annular groove 125 of the fasting pin 112 by the spring pre-tension, which in the following is explained in greater detail with reference to FIGS. 7-15.

A plug fastener shown here, marked 150 in its entirety, represents a combination of the plug 110 and the fastener 130. According to the illustration in FIG. 15 the arrangement is designed such that a distance a between the annular groove 125 of the fastening pin 112 and a bottom of the glide washer 114 of the fastening pin or the bottom of an equipment part (not shown) arranged under the glide washer 114 on the fastening pin 112 facing the annular groove 125 is selected smaller than a distance α' between a facing top of the slide 124 and a support surface 147 of the housing 132, on which the bottom of the slide washer 114 or the equipment part (not shown) come to rest, such that in the locked state the plug fastener 150 of the damper 116 is slightly compressed in the axial direction. The path by which the damper 116 is compressed here, may amount to 0.4 mm, for example. Although the plug 110 remains displaceable in reference to the fastener 130, however it is subject to the pre-tension of the damper 116 such that any noise development is prevented by the two parts 152 and 154 connected to each other by the plug fastener 150.

FIG. 7 shows a side view of an exemplary embodiment of a plug fastener 150 according to the earlier application in the locked state, in which the slide 134 with the edge 137 of the opening 135 is latched in the annular groove 125 of the fastening pin 112. It is discernible in FIG. 7 that the frame 154 is accepted in a form-fitting fashion in the edge of a bore in the circumferential groove 117 of the damper. The fastener 130, as described above, is fastened with its housing 132 via the counter-sunk screws 146a, 146b at one side of the equipment part 152. The type of locking between the slide 134 and the fastening pin 112 is clearly discernible in FIG. 8, which represents a cross-sectional view according to the line VII-VII in FIG. 7, and in FIG. 9, which is a cross-sectional view according to a line IX-IX in FIG. 8.

Figure 10:
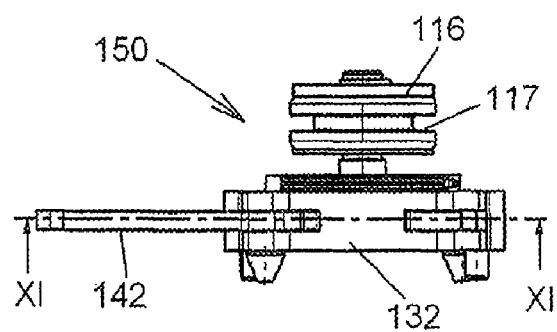
FIG. 10 is a view of the plug fastener similar to FIG. 7, however in the unlocked state.
Figure 12:
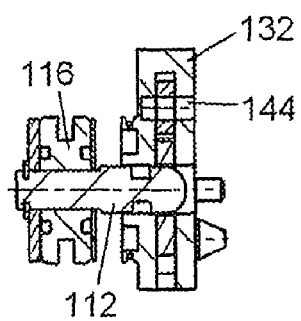
FIG. 12 is a cross-sectional view according to the line XII-XII in FIG. 11.

FIGS. 10-12 show the unlocked state, in which the fastening pin 112 can be disassembled. In FIG. 10 the plug fastener 150 is shown similar to FIG. 7, however in the unlocked state. FIG. 11 is a cross-sectional view according to a line XI-XI in FIG. 10, and FIG. 12 is a cross-sectional view according to the line XII-XII in FIG. 11. In the locked state, according to the illustration in FIG. 8, the eccentric lever 142 is pivoted downward and contacts the stop 143. However, in FIG. 11 the eccentric lever 142 is pivoted upward and contacts the stop 141.

Figure 15:
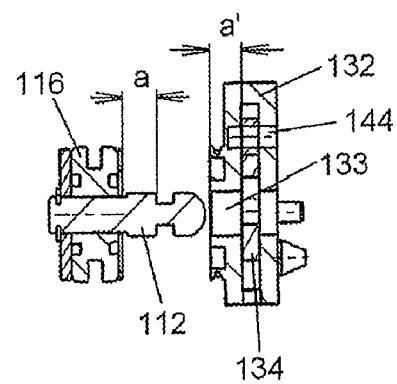
FIG. 15 is a side view according to the line XV-XV in FIG. 14.

In FIGS. 13-15 the normal state of the plug fastener is shown, in which the fastening pin 112 is not inserted into the housing 132, which is clearly discernible in FIG. 13, showing an illustration of the plug fastener 150, as seen in FIG. 7, however in the normal state. FIG. 14 is a cross-sectional view according to the line XIV-XIV in FIG. 13, and FIG. 15 is a cross-sectional view according to the line XV-XV in FIG. 14. In the normal state, similar to the locking state, the eccentric lever 142 contacts the stop 143 as discernible in FIG. 14.

The unlatched state according to FIGS. 10-12 could be adjusted with a simple handle 149 (only shown in FIG. 14 in a dot-dash line) instead of an eccentric lever, such as the eccentric lever 142. The handle 149 would contact or be formed on the slide 134 and by operation via a pushing finger bring the slide 134 into the position shown in FIGS. 10-12.

Figure 2:
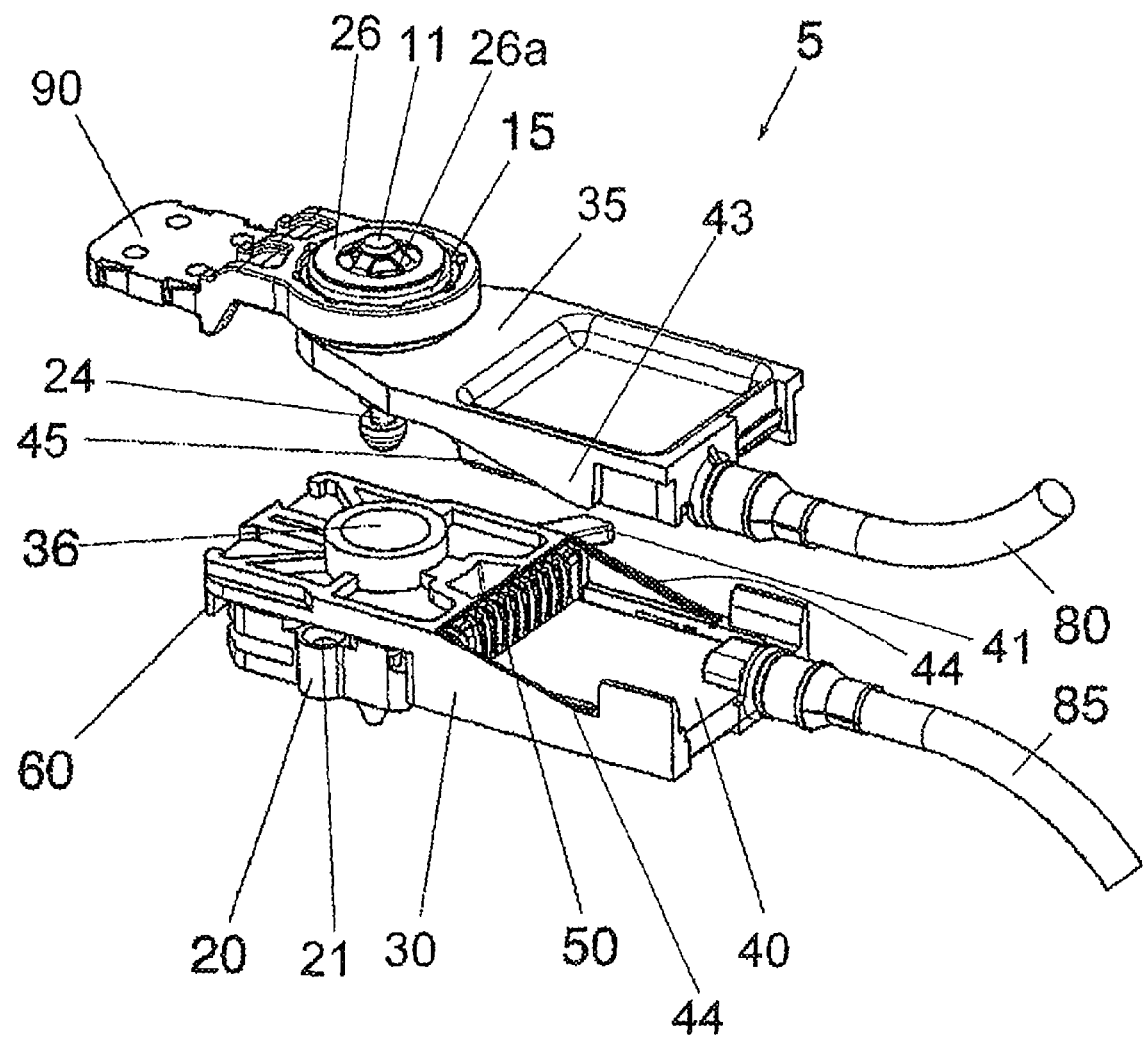
FIG. 2 is an exploded view of the plug fastener according to FIG. 1 in a state, in which the mechanical and the electric connection are separated.
Figure 3:
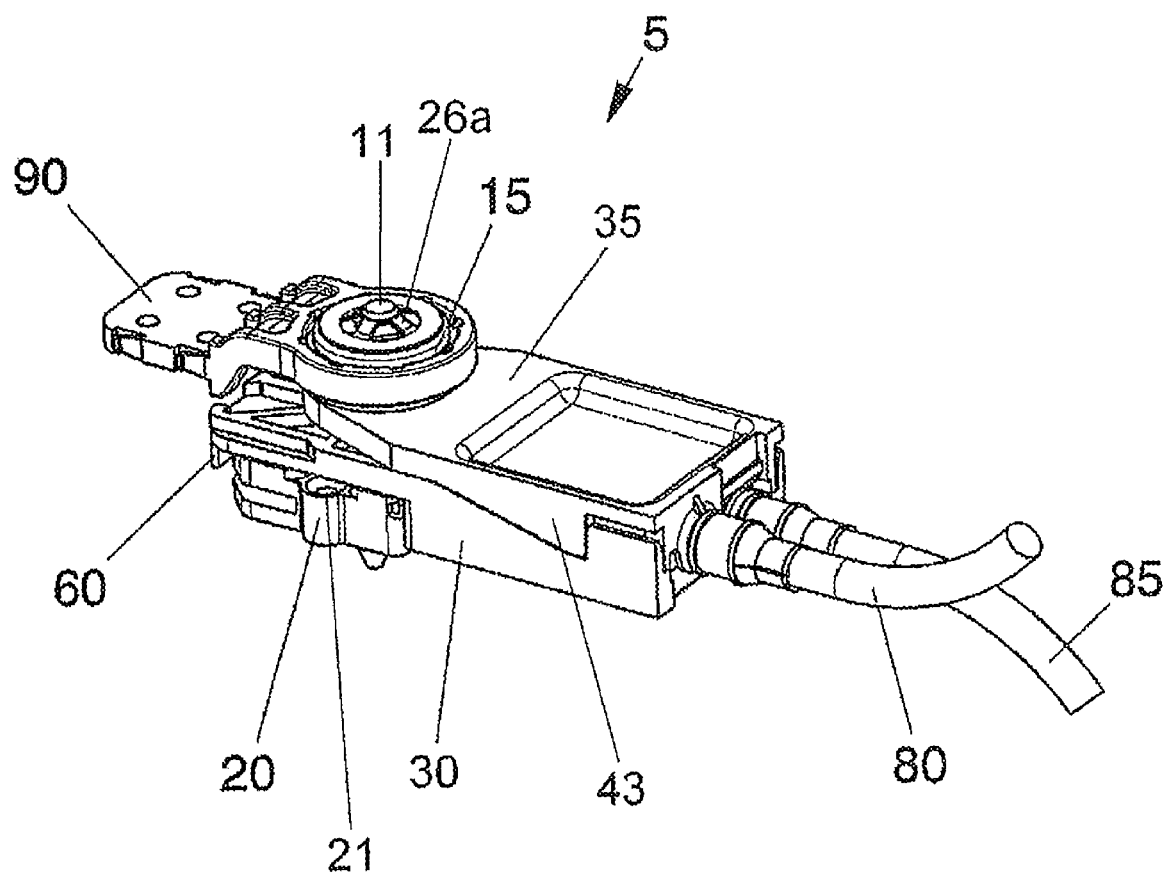
FIG. 3 is a perspective view of the plug fastener according to the invention in a connected state shown in FIG. 1.

An embodiment of a plug fastening according to the invention, in its entirety marked 5, is shown in various views in FIGS. 1 through 3, namely in FIGS. 1 and 3 in a state in which a mechanical and an electric connection is established and fixed, and in FIG. 2 in an illustration shown exploded in a state in which the mechanical and the electric connections are separate. The plug fastening 5 serves for a detachable fastening of an equipment part (not shown) to a sub-frame (not shown, either.) For example, the equipment part may represent the inner cover of the cabin of an airplane or a panel in general. The sub-frame may be an airplane fuselage, for example. It may also represent equivalent parts of a motor vehicle. The plug fastening 5 essentially comprises a fastening pin 11 that can be fixed, for detachably connecting a first fastener 30 and a second fastener 35 to each other, each of which carrying electric contacts 33 and/or 34, between which an electric connection shall be established when the plug connection is in the locked state shown in FIG. 1. This is described in detail in the following.

According to FIG. 1, the fastening pin 11 has a groove 24 at one end, which in the exemplary embodiment shown represents an annular groove. The groove 24 comprises two radially embodied lateral groove walls 24a, 24b. The groove 24 serves to fix the fastening pin 11 in a housing 20, to be explained in greater detail in the following. At its other end the fastening pin 11 comprises an elastic washer-shaped damper 15 to dampen oscillations and to assemble the fastening pin 11. The damper 15 is arranged on the fastening pin 11 between a fastening washer 26 and an axially displaceable glide washer part 27 of the second fastener 35. The fastening washer 26 and the glide washer part 27 are supported on a stop at the fastening pin 11 and/or at a shoulder 28 formed at the fastening pin 11. The stop is formed by an annular groove 29 embodied at one end of the fastening pin 11. The fastening washer 26 is a circular flat spring supported on the damper 26 with arms 26a of the flat spring projecting inwardly and discernible in FIGS. 2 and 3. In the illustration in FIG. 1, the arms of the flat springs extend from the circular flat spring diagonally upwards and are supported with their free ends in the annular groove 29.

A spring pre-stressed slide 22 is supported in the housing 20, displaceable by the insertion of the fastening pin 11 into an opening 37 of the housing against the spring pre-tension and subsequently it can latch in the groove 24 of the fastening pin. The first fastener 30 is mounted at the housing 20. In the exemplary embodiment shown the first fastener 30 is mounted on the housing 20, namely via a slide connection 60. For this purpose, the housing 20 comprises two grooves located on opposite sides, engaged by two projections 61 and/or 62 protruding inwardly and downward from the bottom of the housing 20. In the illustrations in FIGS. 1-3, the first fastener 30 extends from the housing 20 towards the right like a cantilever. The first fastener 30 has a bore 36, which is aligned to the opening 37 of the housing 20 when the housing 20 is inserted into the first fastener 30 and is located in the position shown in FIGS. 1 and 3.

As discernible in FIGS. 1-3, the second fastener 35 is embodied similar to the first fastener 30, however, at its left end, seen in the illustration in FIGS. 1-3, it comprises the already-mentioned glide washer part 27 instead of a housing acceptance part, which replaces the conventional glide washer. At the glide washer part 27, at the side facing away from the shoulder 28 of the fastening pin 11, a bearing socket 32 is formed around a bore 31 of the second fastener 35 accepting the fastening pin 11. The second fastener 35 is supported on the fastening pin 11 in a rotatably and axially displaceable fashion together with the glide washer part 27 and the bearing socket 32. The damper 15 encompasses the bearing socket 32 and is supported on the glide washer part 27 of the second fastener 35. The axial distance between the shoulder 28 and the fastening washer 26 is selected such that the damper 15 is pressed elastically against the second fastener 35 by the elastically embodied fastening washer 26.

During the assembly, the second fastener 35 with the bearing socket 32 is pushed onto the fastening pin 11 until contacting the shoulder 28 of the fastening pin 11. Then the damper 15 is pushed onto the exterior of the bearing socket 32. Finally, the damper 15 and the fastening washer 26, preferably comprising a rubber material, are compressed until the arms of the flat spring 26a latch in the annular groove 29 and thus hold the second fastener 35 elastically pre-stressed on the shoulder 28.

The damper 15 and thus the second fastener 35 can be connected to an equipment part or the sub-frame via the connection aid 90. The connection aid 90 can be fastened, for example via screws or rivets, for which it is provided with bores discernible in FIGS. 2 and 3. The first fastener 30 can be fastened to the equipment part or the sub-frame via means, not shown. The above-mentioned means may represent screws or rivets, with the housing 20 showing two opposite penetrating bores, of which only one being visible in FIGS. 2 and 3.

In FIG. 1 it is discernible that the fastening pin 11 conically tapers at the side facing away from the fastening washer 26 beginning at the shoulder 28 within the thickness of the first fastener 30, comprising in this section a second fastener 35 underneath the glide washer part 27, and is accepted without play in a correspondingly conical bore 38 of the first fastener, fixed as soon as the fastening pin 11 is placed in the housing 20 as shown. The opening 37 in the housing 20 is preferably an oblong hole, which is shown in FIG. 1 in a cross-section, thus it extends in its longitudinal direction perpendicular in reference to the level of the drawing. The fastening pin 11 can be unlatched by an eccentric lever 41, by way of shifting the slide 22 (in the illustration in FIG. 1 toward the right) against the pre-tension applied by the springs 42, with only one of them being discernible in FIG. 1. The first and the second fastener 30, 35 can easily be separated from each other when the fastening pin 11 is unlatched.

In the exemplary embodiment shown here, the two fasteners 30, 35 each have several electric contacts 33 and/or 34. The fasteners 30, 35 are furthermore each embodied such that when the fastening pin 11 is fixed in the housing 20 the fasteners 30, 35 are mounted to each other and the electric contacts 33 of the first fastener 30 are electrically connected to the electric contacts 34 of the second fastener 35. In the exemplary embodiment described here, a connection contact 50, at which the first fastener is mounted, serves to establish the electric connection between the electric contacts 33, 34 as best discernible in FIG. 2. The electric contacts 33 of the first fastener 30 are spring contacts, located in a contact housing 40 such that it projects out of the contact housing 30 to the front in the direction towards the connection contact 50. Accordingly, the second fastener 35 carries a contact housing 45, in which the electric contacts 34 are also embodied as spring contacts, housed such that they project towards the front from the contact housing 45. These spring contacts may represent those of the company Compagnie Deutsch, 9250 Rueil-Malmaison, France. Suitable are spring contacts of the type, by the company Deutsch called sliding contact connectors each and distributed under the trademark 3C®. The corresponding flyer Deutsch, Sliding Contact Connector Automotive Connector System, A Step Ahead, has been published before the priority date of the present application. However, no publishing date is known to the applicant. At their opposite ends the electric contacts 33, 34 are connected to an input cable 80 and/or an output cable 85. When the first and the second fastener 30, 35 are connected to each other, i.e. are in a position shown in FIGS. 1 and 3, the contact housings 40, 45 are essentially located on top of each other. The projections 43, formed at the bottom of the second fastener 35, with only one of them being visible in FIGS. 2 and 3, engage two corresponding recesses 44 in the first fastener 30 when the plug fastener 5 is closed. This ensures that the electric contacts 33, 34 remain in an electric contact to the connection contact 50 under spring pre-tension as long as the plug connection is set to the position shown in FIG. 3. The electric contacts 33 or the electric contacts 34 may each be produced in one piece with the connection contact 50. Further, the electric contacts 33, 34 may be embodied as plug connectors or similar contacts.

Figure 4:
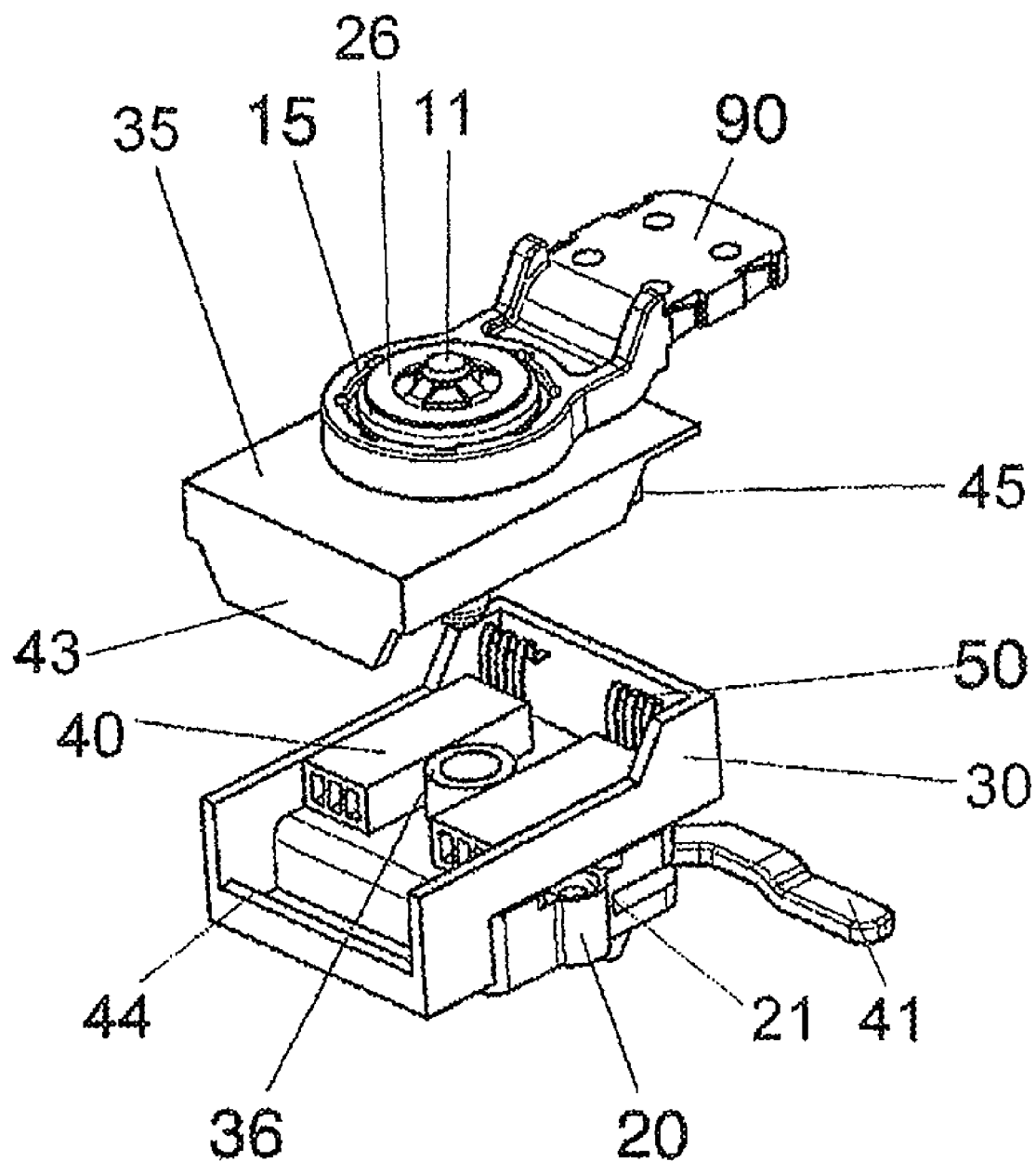
FIG. 4 is a view of the plug fastener according to the invention in another embodiment in a state according to FIG. 2, in which the parts to be mechanically connected and the part to be electrically connected are arranged over top of each other, though.

In FIG. 4 another exemplary embodiment of the plug fastener according to the invention is shown in the state according to FIG. 2, however, here the parts to be connected mechanically and the parts to be connected electrically, i.e. the first fastener 30 and the second fastener 35 on the other side and the contact housing 40 and the contact housing 45 on the other side are arranged over top of each other. Further, for reasons of space, the contact housing 40, 45 are each divided into two partial housings, as discernible at the contact housing 40 at the bottom of FIG. 4. Accordingly the connection contact 50 is embodied in two parts, as also discernible in FIG. 4. In order to release the plug connection according to FIG. 4 only the eccentric lever 41 must be operated, similar to the first exemplary embodiment according to FIGS. 1 through 3.

LIST OF REFERENCE CHARACTERS

5 Plug connection
11 Fastening pin
15 Damper
20 Housing
21 Penetrating bore
22 Slide
24 Groove
24a, 24b Lateral walls of grooves
25 Washer
26 Fastening washer
26a Arms of flat spring
27 Glide washer part
28 Shoulder
29 Annular groove (stop)
30 First fastener
31 Bore
32 Bearing socket
33 Electric contact
34 Electric contact
35 Second Fastener
36 Bore
37 Opening
38 Conical bore
40 Contact housing
41 Eccentric lever
42 Spring
43 Projection
44 Recess
45 Contact housing
50 Connecting contact
60 Slide connection
61 Projection
62 Projection
80 Input cable
85 Output cable
90 Connection aid
110 Plug
112 Fastening pin
114 Glide washer
116 Damper 117 Circumferential groove
118 Fastening washer
120 Cir-clip
121 Shaft section
122 Dome
123 Shoulder
124 Lateral wall of the groove
125 Annular groove
126 Lateral wall of the groove
127 Shaft section
128 Groove
130 Fastener
132 Housing
133 Opening
134 Slide
135 Opening
137 Edge
138 Recess
139a, b Shoulders
140a, b Helical compression spring
141 Stop
142 Eccentric lever
143 Stop
144 Pin
145a, b Bore
146a, b Counter-sunk screws
147 Support surface
149 Handle
150 Plug fastener
152 Equipment part
154 Sub-frame

The invention claimed is:

1. A plug mount (5) for a detachable fastening of an equipment part, the plug mount comprising a fastening pin (11), including at one end a groove (24) for fixing the fastening pin (11) and at the other end an elastic washer-shaped damper (15) for damping oscillations at assembly of the fastening pin (11), which is arranged on the fastening pin (11) between a fastening washer (26) and an axially displaceable glide washer, and having a housing (20) in which a spring pre-stressed slide (22) is supported, which is displaceable by inserting the fastening pin (11) into an opening (37) of the housing (20) against spring pre-tension and subsequently can latch in the groove (24) of the fastening pin (22) by the spring pre-tension, with one of the damper (15) or the housing (20) being assembled to the equipment part and the other one of the damper or the housing being assembled to a sub-frame, a first fastener (30) is mounted to the housing (20) and the glide washer is embodied as a part (27) of a second fastener (35), with the fasteners (30, 35) each carrying at least one electric contact (33, 34) and being embodied such that, when the fastening pin (11) is fixed in the housing (20), the fasteners (30, 35) are mounted to each other and the electric contacts (33, 34) are electrically connected.

2. A plug mount according to claim 1, wherein for establishing an electric connection between the electric contacts (33, 34) at least one of the fasteners (30, 35) carries at least one connecting contact (50).

3. A plug mount according to claim 1, wherein the electric contacts (33, 34) are accepted in a contact housing (40, 45) at each of the fasteners (30, 35) and are connected to an input or output cable (80 or 85).

4. A plug mount according to claim 2, wherein one of the two electric contacts (33, 34) and the connecting contact (50) are produced in one piece.

5. A plug mount according to claim 1, wherein the groove (24) of the fastening pin (11) comprises two radially embodied lateral groove walls (24a, 24b).

6. A plug mount according to claim 1, wherein the first fastener (30) is mounted via a slide connection (60) on the housing (20).

7. A plug mount according to claim 6, wherein the first fastener (30) comprises a bore (36) aligned to the opening (37) of the housing (20).

8. A plug mount according to claim 7, wherein a fastening washer (26) of the second fastener (35) can be supported or is supported on the fastening pin (11) at a stop (29) and the glide washer part (27) of the second fastener (35) can be supported or is supported on a shoulder (28) formed on the fastening pin (11).

9. A plug mount according to claim 8, wherein the fastening washer (26) is a circular flat spring supported on the damper (15) with flat spring arms (26a) projecting inwardly and the stop (29) comprises an annular groove in which the flat spring arms (26a) are supported via free ends thereof.

10. A plug mount according to claim 8, wherein the glide washer part (27) is formed on the second fastener (35).

11. A plug mount according to claim 8, wherein a bearing socket (32) is formed at the glide washer part (27) of the second fastener (35) at a side facing away from the shoulder (28) around a bore (31) that receives the fastening pin (22), by which the second fastener (35) is supported axially displaceable on the fastening pin (11) and with the damper (15) being supported around it on the second fastener (35).

12. A plug mount according to claim 11, wherein an axial distance between the shoulder (28) and the fastening washer (26) is selected such that the damper (15) is pressed against the second fastener (35) by the fastening washer (26).

13. A plug mount according to claim 8, wherein the fastening pin (11) tapers conically at a side facing away from the fastening washer (26) from the shoulder (28) within a thickness of the first fastener (30) and can be accepted or is accepted without play in a corresponding conical bore (38) of the first fastener (30).

14. A plug mount according to claim 1, wherein the opening (37) in the housing (20) is a bore or an oblong bore.

15. A plug mount according to claim 1, further comprising an eccentric lever (41) for unlocking the fastening pin (11) by shifting the slide (22) against the spring pre-tension.

16. A plug mount according to claim 1, further comprising means (21) for fastening the housing (20) at the equipment part or sub-frame.

17. A plug mount according to claim 1, further comprising a connection aid (90) arranged on the damper (15) for fastening the second fastener (35) to the equipment part or sub-frame.

18. A plug mount according to claim 1, wherein the electric contacts (33, 34) are embodied as spring contacts or plug mounts.

* * * * *